United States Patent [19]

Miller

[11] 3,854,553
[45] Dec. 17, 1974

[54] LUBRICATION SYSTEM FOR SWING GEAR DRIVE

[75] Inventor: Calvin L. Miller, Aurora, Ill.

[73] Assignee: Caterpillar Tractor Co., Peoria, Ill.

[22] Filed: Nov. 1, 1973

[21] Appl. No.: 411,774

[52] U.S. Cl. ............................... 184/6.12, 74/467
[51] Int. Cl. ............................................. F16n 29/00
[58] Field of Search ............. 184/6.12; 74/467, 468; 184/6 R

[56] References Cited
UNITED STATES PATENTS

| | | | |
|---|---|---|---|
| 1,757,476 | 5/1930 | Rennerfelt | 184/6.12 X |
| 2,211,363 | 8/1940 | Brenkert | 184/6.12 |
| 2,867,130 | 1/1959 | Moeller | 74/467 X |
| 3,407,902 | 10/1968 | Musser | 184/6.12 |
| 3,515,011 | 6/1970 | Johnson | 74/467 |

Primary Examiner—Manuel A. Antonakas
Attorney, Agent, or Firm—Phillips, Moore, Weissenberger, Lempio & Strabala

[57] ABSTRACT

An excavator comprises an upper unit rotatably mounted on an undercarriage by selectively driving a swing pinion gear against a reaction ring gear secured to the undercarriage. An enclosure, comprising a pan having a cover secured thereon, forms an annular chamber containing the swing pinion and ring gear therein. A pair of wedge-like members, secured to the cover, are disposed on either side of the swing pinion to continuously press grease into meshing teeth of the respective gears.

5 Claims, 2 Drawing Figures

PATENTED DEC 17 1974          3,854,553
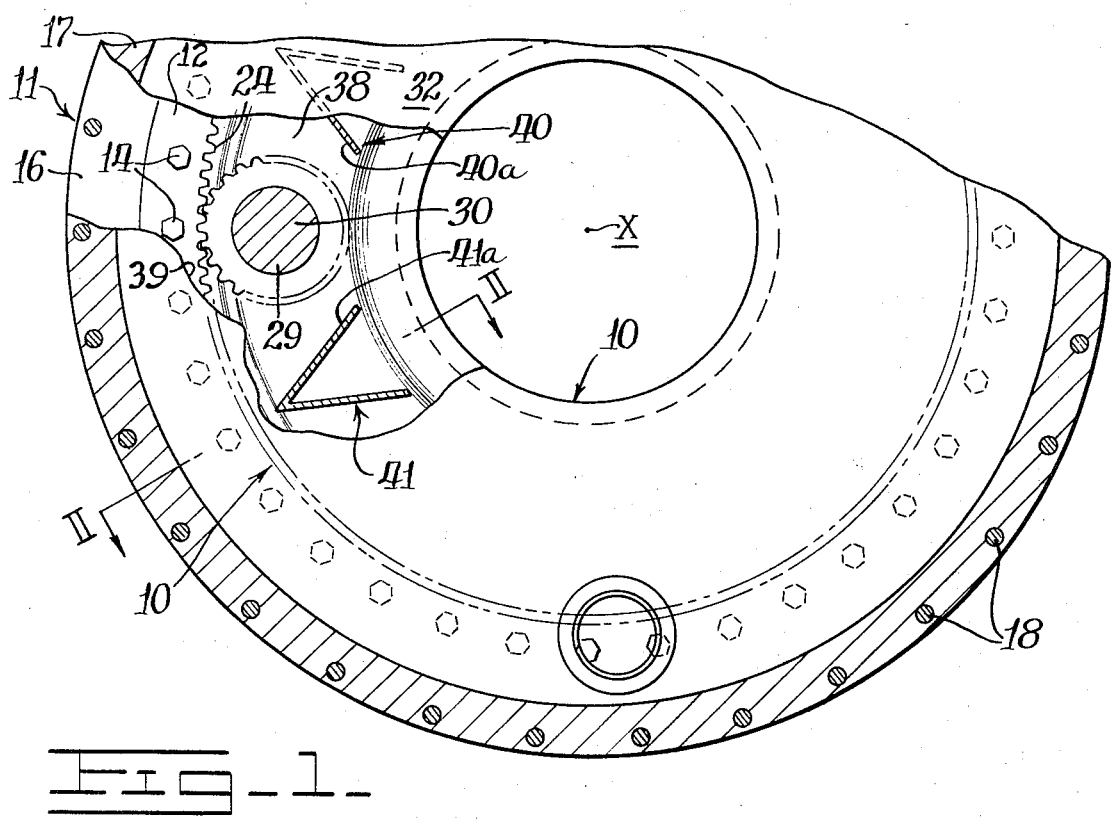
Fig_1_
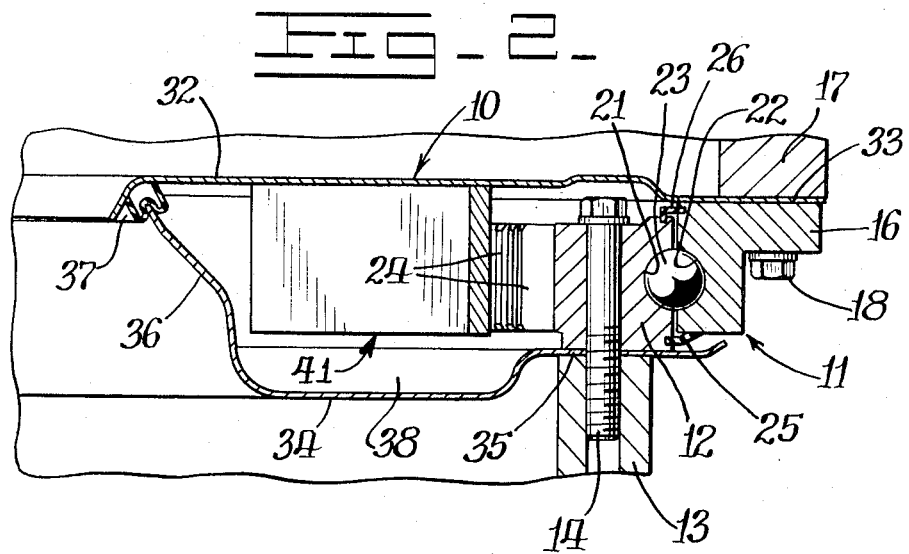
Fig_2_

3,854,553

LUBRICATION SYSTEM FOR SWING GEAR DRIVE

BACKGROUND OF THE INVENTION

The present invention relates to a lubrication system for continuously lubricating a gear drive mechanism, particularly adapted for use in a hydraulic excavator.

Conventional power transmissions employed in excavators include a motor-driven swing pinion which rotates against a stationary ring gear to selectively rotate an upper unit relative to a mobile undercarriage. The swing pinion and associated ring gear are generally exposed to dust and other foreign matters associated with the operation of the excavator. The swing pinion and ring gear are usually lubricated by applying a heavy grease thereto which tends to leave the meshing teeth of the respective gears during excavator operation. Thus, undue wear of the gears results unless the grease is continuously replaced by a workman.

OBJECTS OF THE INVENTION

An object of this invention is to provide an efficient lubrication system for an enclosed gear drive mechanism, comprising meshing ring and pinion gears, which is adapted to continuously lubricate meshing teeth thereof. The lubrication system comprises at least one member disposed on a side of the pinion gear for continuously pressing a lubricant, such as grease, into meshing teeth of the respective gears. In the preferred embodiment of this invention, a pair of such members are disposed on either side of the pinion gear to press grease into the meshing teeth upon rotation of the pinion gear in either direction.

BRIEF DESCRIPTION OF THE DRAWINGS

Other objects of this invention will become apparent from the following description and accompanying drawings wherein:

FIG. 1 is a fragmentary top plan view in section disclosing an enclosed gear drive mechanism and lubrication system for a hydraulic excavator, with portions broken-away for clarification purposes; and FIG. 2 is an enlarged sectional view, taken in the direction of arrows II—II in FIG. 1.

DESCRIPTION OF THE PREFERRED EMBODIMENT

Referring to FIGS. 1 and 2, an enclosure 10 is shown in association with a swing bearing 11 mounted in an excavator. The swing bearing includes an inner ring member 12 secured to an underlying support ring 13 of a mobile undercarriage (not fully shown) by a plurality of circumferentially disposed bolts 14. The inner ring member is concentrically disposed about a vertically disposed central axis X thereof and within an outer ring member 16 attached to a mounting ring 17 of a rotatable upper unit (not shown) by a plurality of bolts 18.

The inner and outer ring members are formed with complementary raceways 21 and 22 (FIG. 2), respectively, which mount a plurality of circumferentially disposed ball bearings 23 therebetween to permit the ring members to rotate relative to each other, about common axis X. The inner ring member has a reaction-type ring gear formed thereon including a plurality of gear teeth 24 positioned to face radially inwardly towards such axis. Annular lip seals 25 and 26 are secured to the inner and outer ring members, respectively, and are maintained in sliding and sealing contact with the inner ring member.

The seals cooperate to retain bearing grease in the enclosure and to prevent the ingress of dust and other foreign matters into the raceways for the bearings. A power transmission, not shown, is fixedly mounted on the upper unit to selectively rotate mounting ring 17 relative to underlying support ring 13 in the usual manner. The transmission drives a vertically disposed swing or output shaft 29 (FIG. 1) having a swing pinion 30 attached on the lower end thereof. The swing pinion is selectively driven against the relatively stationary ring gear to provide a gear drive mechanism for effecting rotation of the upper unit relative to the undercarriage.

As best shown in FIG. 2, enclosure 10 includes a horizontally disposed and annular upper wall or cover 32 which extends radially inwardly from swing bearing 11. The upper wall has a flat, outer flange 33 sealingly secured between outer ring member 16 of the swing bearing and mounting ring 17. The enclosure further includes a pan comprising a horizontally disposed and annular lower wall 34 spaced vertically below the upper wall and an outer flange 35 sealingly secured between inner ring member 12 and support ring 13.

The horizontally disposed lower wall extends radially inwardly from swing bearing 11 and is integrally connected to an upwardly extending inner sidewall 36 of the enclosure. A standard liquid gasket compound, not shown, may be preapplied to both sides of flanges 33 and 35 prior to their final assembly to provide leak-proof seals thereat. An annular seal 37 is secured to an upper edge of sidewall 36 to sealingly engage upper wall 32.

Seal 37, along with seal 26, provides annular sealing means for effecting fluid tight seals thereat. Such sealing means thus fully seals an annular chamber 38, defined in the enclosure by walls 32, 34 and 36 and the toothed side 24 of inner ring member 12. As shown in FIG. 1, an aperture 39 (partially shown) is formed through upper wall 32 to permit the swing pinion 30 to extend therethrough and into chamber 38.

The lubricating means of this invention preferably comprises a pair of members 40 and 41 secured to the underside of cover 32 and disposed on either circumferential side of pinion gear 30. Each vertically disposed member preferably comprises a wedge of V-shaped cross section (FIG. 1) having its apex disposed radially outwardly from axis X. Circumferentially adjacent inner walls 40a and 41a of the two members diverge inwardly towards each other and towards axis X to continuously press grease into the meshing teeth of the ring and pinion gears, upon rotation of the pinion gear in either direction.

What is claimed is:

1. A gear drive mechanism comprising a horizontally disposed, annular ring gear having teeth formed thereon which face radially inwardly towards a vertically disposed central axis thereof and a pinion gear mounted for rotation about a vertically disposed axis thereof, parallel to said central axis, and meshing with the teeth of said ring gear, an annular enclosure enclosing said gear drive mechanism in an annular chamber thereof and lubricating means, including at least one member disposed in said chamber on a circumferential side of said pinion gear, for continuously pressing a lubricant into meshing teeth of said ring and pinion gears.

2. The invention of claim 1 wherein a pair of said members are disposed on either circumferential side of said pinion gear.

3. The invention of claim 1 wherein said enclosure comprises an annular pan having an annular cover secured in sealing relationship thereon.

4. The invention of claim 3 wherein said member is secured to said cover to project vertically downwardly in close proximity to said pan.

5. The invention of claim 1 wherein said member is V-shaped to have its apex positioned radially outwardly away from said central axis.

* * * * *